United States Patent [19]
Kanda

[11] Patent Number: 5,356,195
[45] Date of Patent: Oct. 18, 1994

[54] REAR SPOILER MOUNTING STRUCTURE FOR AN AUTOMATIC VEHICLE AND VEHICLE SO EQUIPPED

[75] Inventor: Kazunori Kanda, Hiroshima, Japan

[73] Assignee: Mazda Motor Corporation, Hiroshima, Japan

[21] Appl. No.: 33,792

[22] Filed: Mar. 18, 1993

[30] Foreign Application Priority Data

Mar. 18, 1992 [JP] Japan ............................ 4-023632

[51] Int. Cl.⁵ ............................ B62D 35/00; B60J 5/10
[52] U.S. Cl. .................................. 296/180.1; 296/76; 296/146.8
[58] Field of Search .................. 296/76, 180.1, 180.2, 296/189, 146.8; 180/903

[56] References Cited

FOREIGN PATENT DOCUMENTS

| 3539177 | 5/1987 | Fed. Rep. of Germany ... 296/180.1 |
| 0078875 | 5/1985 | Japan ........................... 296/180.1 |
| 60-90072 | 6/1985 | Japan . |
| 62-196779 | 12/1987 | Japan . |

*Primary Examiner*—Dennis H. Pedder
*Attorney, Agent, or Firm*—Keck, Mahin & Cate

[57] ABSTRACT

A rear spoiler mounting structure of an automotive vehicle has a supporting frame of a back door forming a tail lift gate. A rear window glass is mounted and fixed on the supporting frame and has a pair of indented portions or cutouts provided on the right and left peripheries of the rear window glass. A rear spoiler, having a pair of mounting bases, connects with the vehicle body with the mounting bases located so as to overlay the respective indented portions or cutouts to cover them fully and completely. The mounting bases of the rear spoiler are connected to the supporting frame on opposite sides of the rear window glass.

10 Claims, 6 Drawing Sheets

5,356,195

REAR SPOILER MOUNTING STRUCTURE FOR AN AUTOMATIC VEHICLE AND VEHICLE SO EQUIPPED

FIELD OF THE INVENTION

The present invention relates to a rear spoiler structure for mounting a rear spoiler onto a rear window glass provided on the rear vehicle body and a vehicle so equipped.

DESCRIPTION OF THE PRIOR ART

In the art of a rear vehicle body in general, commonly, a rear spoiler is provided on the rear structure of the vehicle to improve aerodynamic effects. If the vehicle has a back door, and is of a so-called hatch-back type, the rear spoiler is preferably mounted on the vehicle body at a portion avoiding the rear window glass. Such is shown, for example, in Unexamined Japanese Utility Model Publication No. 62-196779. However, this imposes a limitation as the extent of rear spoiler mounting body portion available owing to the design of the rear window glass, is sometimes quite small. Therefore, for example, in Unexamined Japanese Utility Model Publication No. 60-90072, there is suggested an improvement of a rear spoiler tightly mounted onto a real window glass with a member penetrating through an opening provided on the rear window glass. Accordingly, the above explained limitation on the mounting position is overcome, and the appearance is improved by the integral structure of the rear window glass and the rear spoiler.

However, in accordance with the above explained structure to provide a rear spoiler onto a rear window glass, since the rear spoiler is substantially supported by the rear window glass, the appearance of the supporting structure is improved in a sense, but on the other hand, the mounting rigidity of the rear spoiler to the rear window glass is less rigid and the rear spoiler may get out of joint with the rear window glass when the rear window glass is damaged.

It is, therefore, an object of the present invention to provide a rear spoiler mounting structure to the rear window glass having higher mounting rigidity and preventing disjointing of the rear spoiler from the rear window glass.

To achieve the object of the present invention, the rear spoiler mounting structure of an automotive vehicle comprises a supporting frame of a back door provided along the adjacent portion of a rear window glass periphery and to which said rear window glass is mounted and fixed, a pair of indented portions provided on the right and left peripheries of the rear window glass, and a rear spoiler having a pair of mounting bases to be connected with the vehicle body. The mounting bases are located over the respective indented portions when they are mounted, wherein each mounting base covers the associated indented portion fully and completely and the rear spoiler is connected in a secure manner to the supporting frame.

DETAILED DESCRIPTION OF THE PREFERRED EMBODIMENT

Figure 1:
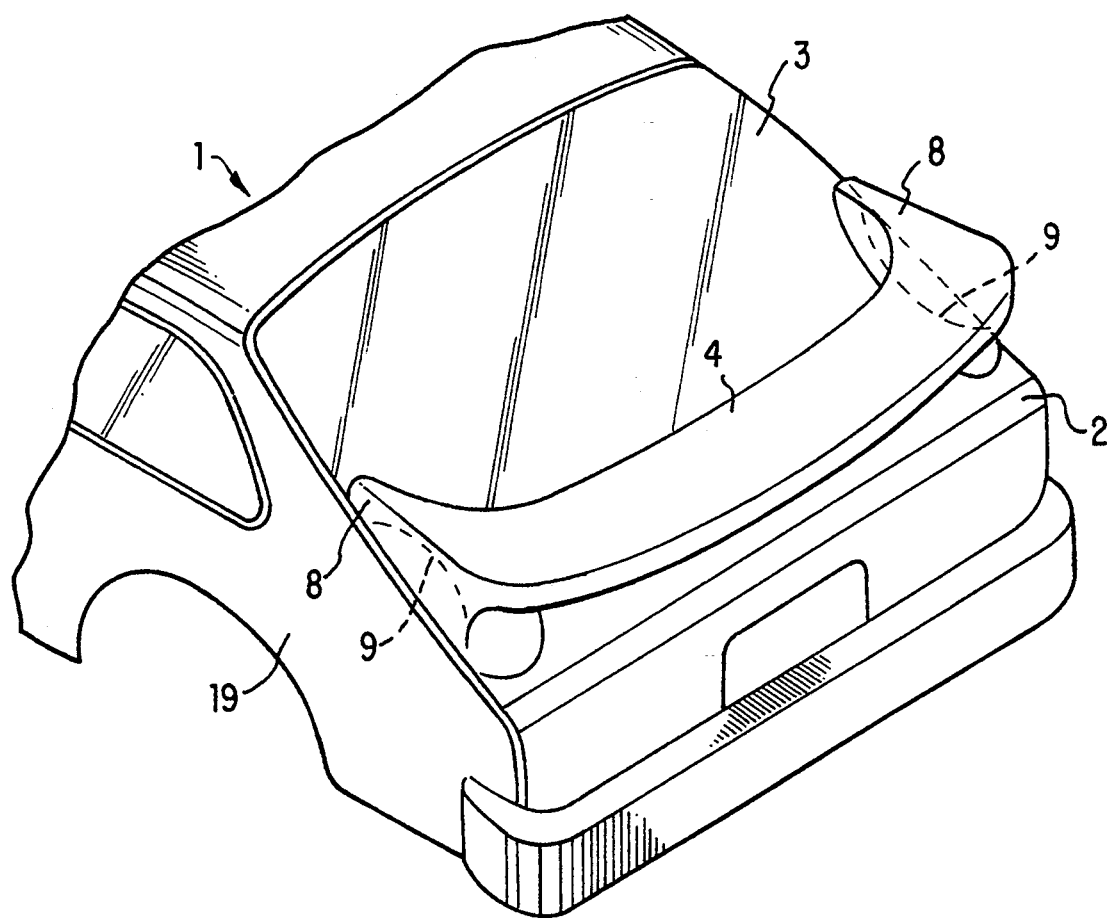
FIG. 1 is a perspective view of a rear body structure of an automotive vehicle in accordance with the present invention.

Referring initially to FIG. 1, there is shown a perspective view of a rear body structure of a vehicle and, more particularly, a rear body structure providing a back door 2, which is a so-called hatch-back type. The back door 2 also provides a rear window glass 3, and a rear spoiler 4 is so mounted on the back door 2 that the rear spoiler 4 is located above or spaced from the rear window glass 3.

The numeral 19 is a rear fender consisting as part of a vehicle body 1 and, as will be explained below, includes a closed cross section adjacent the back door 2 as a mounting frame.

A pair of mounting legs 8 extending downward are formed on the right and left side ends of the rear spoiler 4, and the legs 8 step across or extend over the rear window glass, and are connected and fixed to the back door 2.

Figure 2:
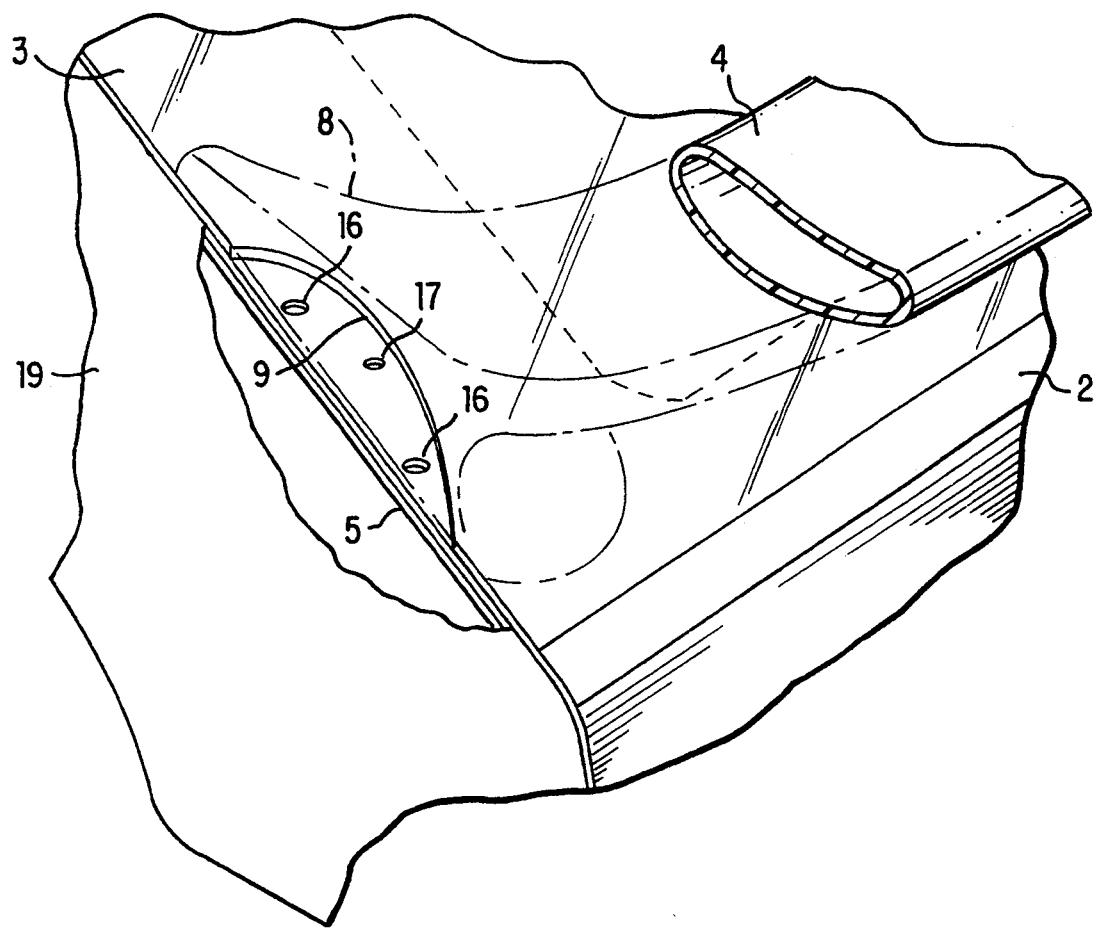
FIG. 2 is an enlarged perspective view of the mounting portion of the rear spoiler, FIG. 3 Is a bottom plan view of the mounting base of the rear spoiler.

FIG. 2 is an enlarged perspective view of the mounting portion of the rear spoiler. The back door 2 includes a closed section lifting gate 5. Hereupon, the rear window glass 3 is fixed to the outer surface of the lifting gate 5, which provides a peripheral mounting for the perimeter of the rear window glass. A sealing member 6 and a sealing member 7 are interposed between the rear window glass 3 and the lifting gate 5.

A pair of indentions or cutouts 9 are defined on both right and left side peripheral edges of the rear window glass 3. The lifting gate 5 is surfaced or extended laterally to underlie the indented portions 9. Flange 15 of gate 5 extends outwardly and underlies legs 8 while the top surface of gate 5 is connected to the mounting legs 8 through the recesses provided by the indented portions 9 and, further, the mounting legs 8 are so provided, wide enough, to cover the indented portions 9 when connected.

Still further, on the lifting gate 5 in the recesses provided at the indented portions 9 of the rear window glass 3, there is defined openings 16 for bolts 11 and an opening 17 for elastically connecting a tack pin 12, which serve to connect gate 5 and flange 15 to legs 8.

Figure 3:
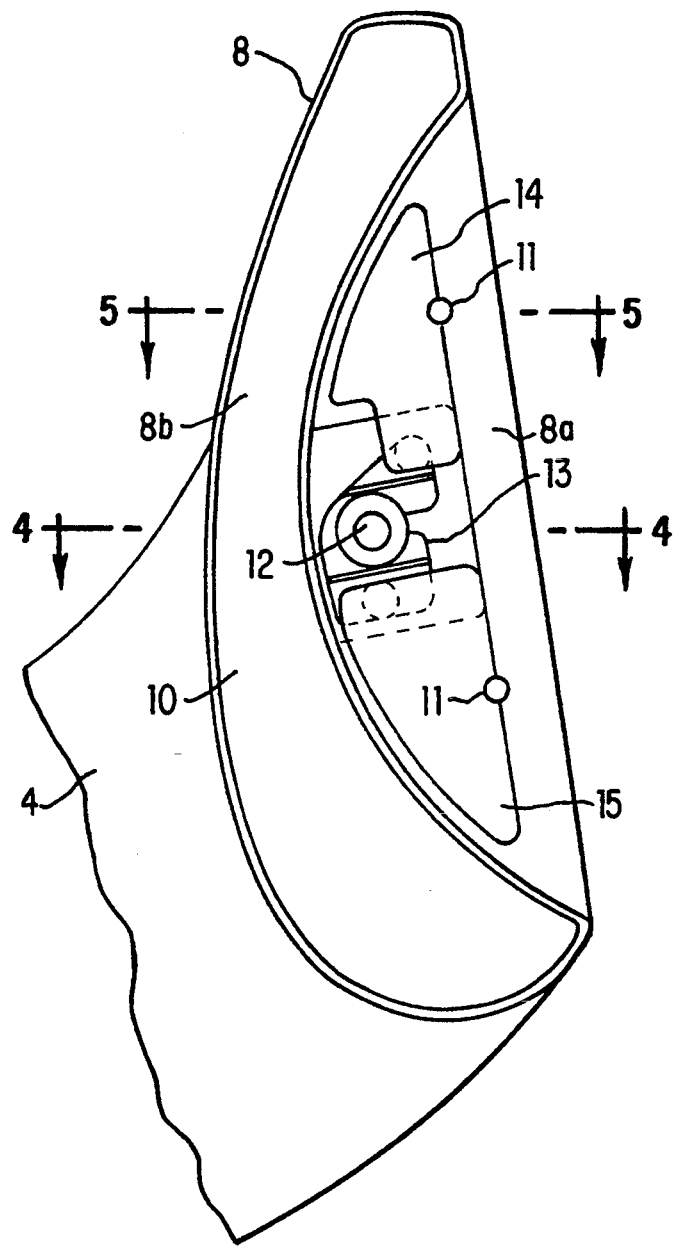

FIG. 3 is a plan view of the mounting base of the rear spoiler.

The size of the sectional surface of the rear spoiler mounting base is set larger than the opening of the indented portions to cover completely the opening of the indentions. The mounting base consists of a first base portion 8a and a second base portion 8b. The first base portion 8a covers over the indented portion 9 along the inner portion adjacent to the periphery thereof. The second base portion 8b contacts on the rear window glass at the right and left side inner edges of the indented portions 9 extending in the transverse direction of the vehicle, and a foaming or elastic strip cushion 10 is interposed at the contacting portion between the rear window glass and the base portion 8b.

In addition, at the mounting portion 8a thrusting into the indented portion 9, there is provided two front and rear bolts 11 integrally formed with the rear spoiler 4. Between bolts 11, a tack pin 12 is fixed by holding metal fittings 13 which are primarily fixed to the mounting base 8. Further, at the base portion 8a, there is provided a sheet 14 of protector made from plastic material such as polyvinyl chloride or the like, which cushions the mounting of legs 8 on gate 5, assisting in securing same via the bolts 11 and the tack pin 12.

Figure 4:
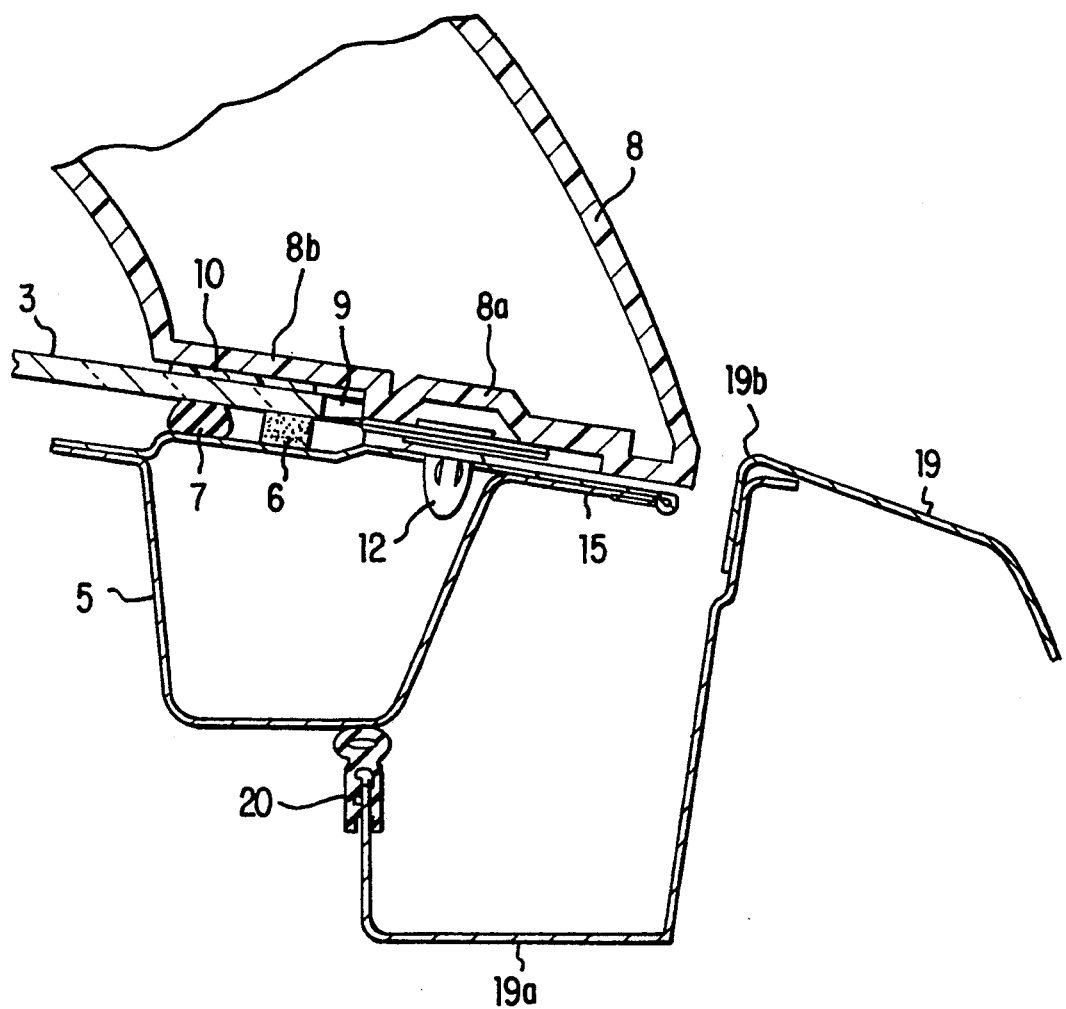
FIG. 4 is a sectional view of the rear spoiler mounting base of FIG. 3 taken along line 4—4.
Figure 5:
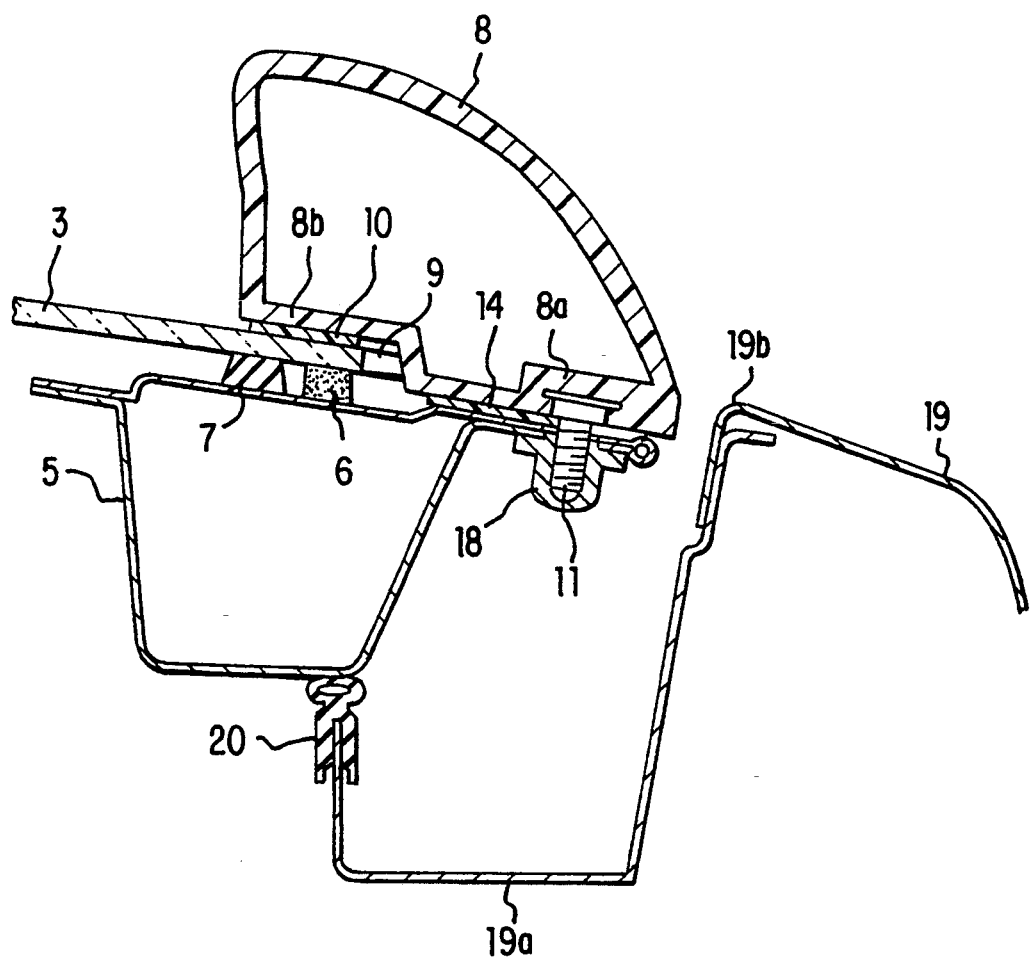
FIG. 5 is a sectional view of the rear spoiler mounting base of FIG. 3 taken along line 5—5.

FIG. 4 and FIG. 5 are sectional views of the rear spoiler taken along 4—4 and 5—5 lines, respectively, of FIG. 3.

The rear spoiler 4 is elastically tacked and tightly connected by the tack pin 12 such that it will not come loose from the lifting gate 5. Bolts 11 penetrate through the holes 16 and receive nuts 18 to assist further in clamping the rear spoiler 4 to gate 5.

Since the rear spoiler 4 is connected to the lifting gate 5 through the indented portions 9, the rear spoiler 4 can overlay the rear window glass 3, and accordingly, the appearance of the mounting structure is improved. Moreover, since the indented portions 9 formed on the edge of the rear window glass 3 are completely covered by the mounting base 8 of the rear spoiler 4 from the outer side of the vehicle, the appearance of the mounting portion is further improved. Still further, by the structure of direct connection of the rear spoiler 4 to the lifting gate 5 on the vehicle body, the intensity (strength and rigidity) of the joint portion is further increased, and accordingly, the supporting intensity of the rear spoiler 4 is also increased. As a result, disconnection of the rear spoiler 4 from the vehicle body is prevented even when the rear window glass 3 is damaged at the mounting portion.

In the mounting state of the rear spoiler 4, a resilient strip or cushion 10 is interposed in the space between the base portion 8b of the mounting base 8 and the rear window around the indented portions 9. Hence, even though there may be a thickness disproportion in the rear window glass, the elasticity of the cushion 10 can absorb the glass thickness disproportion. Since resilient protector or cushion 14 is interposed between the base portion 8a of the mounting base 8 and the lifting gate member 5, flange 15, this increases the intensity of the connecting portion that fixed the mounting base 8 relative to the rear window glass through the bolts 11 and nuts 18, accordingly.

In the state that the back door 2 is closed, as shown in FIG. 4 and FIG. 5, the lifting gate 5 bears against or engages an inner panel 19a of a rear fender 19 through a sealing member 20, and, accordingly, this construction gives sealing effect to the vehicle compartment.

At the portion where the rear spoiler 4 is mounted, the area around the connecting portion of the mounting base 8 and the lifting gate 5 may be conspicuous when viewed from the outside through the gap between back door 2 and the rear fender 19. To improve on this aspect, in accordance with the present invention, at least at the mounting portion of the rear spoiler, a peak 19b of the rear fender 19 is set higher than the highest portion of the corresponding elevation of the back door 2 when it is closed. Therefore, the mounting portion is fully covered and unable to be seen from the outside, being screened by the rear fender 19. Accordingly, the appearance of the vehicle is improved.

Figure 6:
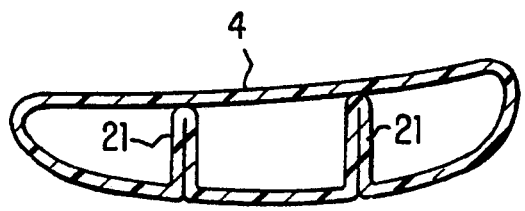
FIG. 6 is a sectional view of the rear spoiler.

FIG. 6 shows in cross section the rear spoiler structure in accordance with the present invention and, as required in the structure of an automotive vehicle providing a rear spoiler, not only the mounting rigidity but the rigidity of the rear spoiler itself is required. To satisfy this requirement, ribs 21 are formed inside the rear spoiler 4 by folding extensions in the bottom upon themselves and interconnecting the base wall with the upper wall thereof. With this structure, rigidity of the rear spoiler 4 is improved without making any significant change to the shape of the rear spoiler. This is accomplished by using these vertically oriented ribs 21.

Figure 7:
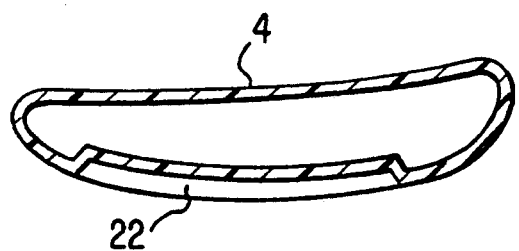
FIG. 7 is another sectional view of the rear spoiler.

In FIG. 7 a modification of the rear spoiler structure is shown. Where a significant load is applied to the rear spoiler 4, the mounting portion between the mounting base 8 and the lifting gate 5 may be ruptured by the load and this may cause disconnection of the rear spoiler from the mounting portion. In this modification, the rear spoiler 4 at its intermediate portion in the transverse direction provides a groove or recess 22 extending in the longitudinal direction of the rear spoiler on its under surface. Consequently, the rear spoiler tends to rupture along the groove (weakened portion) 22 when subjected to a load greater than a predetermined value. This prevents fracture on the mounting portions of spoiler 4 and prevents disconnection of the mounting bases of the rear spoiler.

Although the invention has been described in terms of specific embodiments, changes are possible that will be evident to one skilled in the art. Such changes shall be deemed to fall within the purview of the invention as claimed.

What is claimed is:

1. A rear structure for an automotive vehicle comprising:
    a back door including a lifting gate having an outer surface,
    a rear window glass mounted and fixed on said outer surface,
    said rear window glass in including an indentation defining on each of right and left peripheries of said rear window glass, and
    a rear spoiler having a pair of mounting legs, connected with the lifting gate, and a cross bar extending between and interconnecting said mounting legs, each of said mounting legs having a mounting base formed thereon and attached directly to the lifting gate within one of said indentations, each said mounting base overlaying and covering an edge of one of said indentations.

2. A rear structure for an automotive vehicle as defined in claim 1, wherein each said mounting base comprises a portion extending inwardly of the edge and overlaying the rear window glass and a portion attached directly to said lifting gate.

3. A rear structure for an automotive vehicle as defined in claim 2, and further comprising a cushioning pad interposed between said rear window glass and one of the portions of said mounting base.

4. A rear structure for an automotive vehicle as defined in claim 2, wherein a cushioning sealing member is interposed between said rear window glass and said outer surface.

5. A rear structure for an automotive vehicle as defined in claim 2, wherein the portion attached to said lifting gate juts downwardly beyond the portion overlaying said rear window glass.

6. A rear structure for an automotive vehicle as defined in claim 2, and further comprising a tack pin fixed to each said mounting base for attachment of said portion attached to said lifting gate to said lifting gate.

7. A rear structure for an automotive vehicle as defined in claim 6, wherein said tack pin penetrates a portion of the lifting gate having a closed cross section.

8. A rear structure for an automotive vehicle as defined in claim 7, and further comprising a rear fender panel disposed adjacent the rear spoiler and extending higher than said portion of said lifting gate having said closed cross section when said back door is closed.

9. A rear structure for an automotive vehicle as defined in claim 2, and further comprising a bolt formed together with each said portion attached to said lifting gate.

10. A rear structure for an automotive vehicle as defined in claim 9, and further comprising a flange, formed on said lifting gate and extending toward outer sides of said vehicle in a transverse direction, to which each said bolt is fixed.

* * * * *